(12) United States Patent
Lee et al.

(10) Patent No.: US 12,214,380 B2
(45) Date of Patent: Feb. 4, 2025

(54) CAPACITIVE MICROMACHINED ULTRASONIC TRANSDUCER

(71) Applicants: KOREA INSTITUTE OF SCIENCE AND TECHNOLOGY, Seoul (KR); Inha University Research and Business Foundation, Incheon (KR); SEOUL NATIONAL UNIVERSITY HOSPITAL, Seoul (KR)

(72) Inventors: Byung Chul Lee, Seoul (KR); Rino Choi, Seoul (KR); Whal Lee, Seoul (KR)

(73) Assignees: KOREA INSTITUTE OF SCIENCE AND TECHNOLOGY, Seoul (KR); INHA UNIVERSITY RESEARCH AND BUSINESS FOUNDATION, Incheon (KR); SEOUL NATIONAL UNIVERSITY HOSPITAL, Seoul (KR)

( * ) Notice: Subject to any disclaimer, the term of this patent is extended or adjusted under 35 U.S.C. 154(b) by 546 days.

(21) Appl. No.: 16/775,271

(22) Filed: Jan. 29, 2020

(65) Prior Publication Data

US 2020/0238334 A1    Jul. 30, 2020

(30) Foreign Application Priority Data

Jan. 29, 2019    (KR) .................. 10-2019-0011480

(51) Int. Cl.
*B06B 1/02* (2006.01)
*G01N 29/24* (2006.01)

(52) U.S. Cl.
CPC ....... *B06B 1/0292* (2013.01); *G01N 29/2406* (2013.01); *G01N 29/245* (2013.01); *B06B 2201/51* (2013.01)

(58) Field of Classification Search
None
See application file for complete search history.

(56) References Cited

U.S. PATENT DOCUMENTS 5,510,276 A * 4/1996 Diem ................. G01L 9/0055
                                                      148/DIG. 135
6,004,832 A * 12/1999 Haller .................. B06B 1/0292
                                                      216/2

(Continued)

FOREIGN PATENT DOCUMENTS

CN      1492994 A      4/2004
CN    101578686 A     11/2009

(Continued)

OTHER PUBLICATIONS

Korean Office Action for Application No. 10-2019-0011480 mailed on Apr. 22, 2020. In conformance with MPEP 609—Concise explanation of the relevance includes issue date of KR OA and references cited therein.

(Continued)

*Primary Examiner* — Luke D Ratcliffe
*Assistant Examiner* — Jonathan D Armstrong
(74) *Attorney, Agent, or Firm* — CANTOR COLBURN LLP

(57) ABSTRACT

Provided is a capacitive micromachined ultrasonic transducer (CMUT) including a substrate, a top electrode provided on the substrate to be spaced apart from the substrate, a supporter made of an insulating material and coupled between the substrate and an edge of the top electrode to support and fix the edge of the top electrode and to define a gap between the substrate and the edge of the top electrode, and a plurality of nanoposts having both ends coupled and fixed to the substrate and the top electrode in the gap, and being compressible and stretchable in a longitudinal direc- (Continued)

tion to at least vertically move the top electrode when power is applied to the top electrode.

13 Claims, 16 Drawing Sheets

(56) References Cited

U.S. PATENT DOCUMENTS

| | | | | |
|---|---|---|---|---|
| 6,201,629 | B1* | 3/2001 | McClelland | G02B 26/0841 |
| | | | | 359/223.1 |
| 6,295,247 | B1* | 9/2001 | Khuri-Yakub | H03H 9/46 |
| | | | | 367/140 |
| 6,512,625 | B2* | 1/2003 | Mei | G03F 7/70375 |
| | | | | 359/290 |
| 6,600,587 | B2* | 7/2003 | Sniegowski | B81B 3/007 |
| | | | | 359/848 |
| 7,030,536 | B2* | 4/2006 | Smith | H02N 1/006 |
| | | | | 381/174 |
| 7,365,553 | B2* | 4/2008 | Garabedian | G01R 3/00 |
| | | | | 324/754.18 |
| 7,675,221 | B2* | 3/2010 | Machida | B06B 1/0292 |
| | | | | 257/532 |
| 8,008,105 | B2* | 8/2011 | Huang | B06B 1/0292 |
| | | | | 438/52 |
| 8,796,901 | B2* | 8/2014 | Huang | H02N 1/006 |
| | | | | 367/181 |
| 9,067,779 | B1* | 6/2015 | Rothberg | B81B 7/007 |
| 2002/0135273 | A1 | 9/2002 | Mauchamp et al. | |
| 2004/0085858 | A1* | 5/2004 | Khuri-Yakub | B81C 1/00158 |
| | | | | 367/181 |
| 2004/0106221 | A1* | 6/2004 | Hunter | G02B 26/0808 |
| | | | | 257/E27.013 |
| 2004/0191127 | A1* | 9/2004 | Kornblit | B01F 33/3031 |
| | | | | 422/400 |
| 2005/0168849 | A1* | 8/2005 | Lin | G02B 5/284 |
| | | | | 359/850 |
| 2005/0224975 | A1* | 10/2005 | Basavanhally | H01L 24/90 |
| | | | | 257/E23.024 |
| 2005/0228285 | A1* | 10/2005 | Huang | B06B 1/0292 |
| | | | | 600/459 |
| 2005/0237858 | A1* | 10/2005 | Thomenius | G01N 29/0609 |
| | | | | 367/155 |
| 2006/0075818 | A1* | 4/2006 | Huang | B06B 1/0292 |
| | | | | 73/649 |
| 2008/0197751 | A1* | 8/2008 | Huang | B06B 1/0292 |
| | | | | 310/311 |
| 2008/0290756 | A1* | 11/2008 | Huang | H02N 1/006 |
| | | | | 310/300 |
| 2009/0140609 | A1* | 6/2009 | Huang | B06B 1/0292 |
| | | | | 310/334 |
| 2011/0242932 | A1* | 10/2011 | Lebental | B60B 1/0292 |
| | | | | 367/181 |
| 2013/0162102 | A1* | 6/2013 | Sammoura | B06B 1/0603 |
| | | | | 310/321 |
| 2014/0264660 | A1* | 9/2014 | Rothberg | G01N 29/2406 |
| | | | | 438/51 |
| 2015/0032002 | A1* | 1/2015 | Rothberg | B06B 1/0292 |
| | | | | 600/440 |
| 2015/0183634 | A1* | 7/2015 | Wang | G01N 29/2406 |
| | | | | 257/417 |
| 2016/0009544 | A1* | 1/2016 | Rothberg | H01L 24/94 |
| | | | | 257/737 |
| 2016/0023244 | A1* | 1/2016 | Zhuang | B81B 3/0037 |
| | | | | 29/829 |
| 2017/0136495 | A1* | 5/2017 | Zhao | A61B 8/52 |
| 2017/0258448 | A1* | 9/2017 | Maruyama | G01S 15/8929 |
| 2018/0257927 | A1* | 9/2018 | Rothberg | B81C 1/00182 |
| 2019/0275561 | A1* | 9/2019 | Fife | B06B 1/0207 |
| 2020/0156111 | A1* | 5/2020 | Gross | B81B 3/0086 |

FOREIGN PATENT DOCUMENTS

| | | | | |
|---|---|---|---|---|
| CN | 103958079 | A | | 7/2014 |
| CN | 104923467 | A | | 9/2015 |
| CN | 109092649 | A | | 12/2018 |
| CN | 109092649 | B | * 5/2020 | ............ B06B 1/02 |
| EP | 0995093 | B1 | * 3/1997 | |
| EP | 1580528 | A1 | * 9/2005 | |
| JP | 1056690 | A | | 2/1998 |
| JP | 2001326999 | A | | 11/2001 |
| JP | 2003511664 | A | * 3/2003 | |
| JP | 2006119001 | A | * 5/2006 | |
| JP | 2006119002 | A | * 5/2006 | |
| JP | 2008224229 | A | * 9/2008 | |
| JP | 20114280 | A | | 1/2011 |
| KR | 1020170029497 | A | | 3/2017 |
| KR | 1020180030777 | A | | 3/2018 |
| WO | WO-2004016036 | A2 | * 2/2004 | ............ B06B 1/0688 |
| WO | WO-2008045312 | A1 | * 4/2008 | |
| WO | WO-2009073562 | A1 | * 6/2009 | |

OTHER PUBLICATIONS

Chinese Office Action for Application No. 202010078743.6 mailed on Dec. 30, 2020. In conformance with MPEP 609—Concise explanation of the relevance includes issue date of CN OA and references cited therein.

* cited by examiner

CAPACITIVE MICROMACHINED ULTRASONIC TRANSDUCER

CROSS-REFERENCE TO RELATED PATENT APPLICATION

This application claims the benefit of Korean Patent Application No. 10-2019-0011480, filed on Jan. 29, 2019, in the Korean Intellectual Property Office, the disclosure of which is incorporated herein in its entirety by reference.

BACKGROUND

1. Field

The present invention relates to an ultrasonic device and, more particularly, to a capacitive micromachined ultrasonic transducer (CMUT).

2. Description of the Related Art

Ultrasonic transducers (or ultrasonic probes) refer to devices for converting an electrical signal into an ultrasonic signal or converting an ultrasonic signal into an electrical signal. Although piezoelectric micromachined ultrasonic transducers (PMUTs) for processing an ultrasonic signal by using a piezoelectric material have been widely used, currently, research is being conducted on capacitive micromachined ultrasonic transducers (CMUTs) capable of increasing an operating frequency range and a transducer bandwidth and of achieving integration through a semiconductor process.

However, the CMUTs may not easily have high transmission and reception sensitivity due to a small average displacement caused by a limited gap height between electrodes and a limited voltage. That is, in existing CMUTs, edges of moving cells arranged at a low density are all fixed and thus an average displacement is small due to large displacements only at a center portion and small displacements at an edge portion. Increasing of a gap height to increase the average displacement requires application of a high voltage and thus is not desirable. Furthermore, multi-frequency operation of CMUTs is required to increase applicability of the CMUTs.

RELATED ART DOCUMENT

Patent Document (Patent Document 1) 1. Korean Patent Publication No. 10-2017-0029497 published on Mar. 15, 2017
(Patent Document 2) 2. Korean Patent Publication No. 10-2018-0030777 published on Mar. 26, 2018

SUMMARY

The present invention provides a capacitive micromachined ultrasonic transducer (CMUT) capable of increasing transmission and reception sensitivity by increasing an average displacement. The present invention also provides a CMUT capable of using multiple frequencies. However, the scope of the present invention is not limited thereto.

According to an aspect of the present invention, there is provided a capacitive micromachined ultrasonic transducer (CMUT) including a substrate, a top electrode provided on the substrate to be spaced apart from the substrate, a supporter made of an insulating material and coupled between the substrate and an edge of the top electrode to support and fix the edge of the top electrode and to define a gap between the substrate and the edge of the top electrode, and a plurality of nanoposts having both ends coupled and fixed to the substrate and the top electrode in the gap, and being compressible and stretchable in a longitudinal direction to at least vertically move the top electrode when power is applied to the top electrode.

Each of the plurality of nanoposts may include a lower reinforcement having a larger cross-sectional area compared to a body at a lower part of the nanopost in contact with the substrate, to increase coupling force to the substrate.

Each of the plurality of nanoposts may include an upper reinforcement having a larger cross-sectional area compared to a body at an upper part of the nanopost in contact with the top electrode, to increase coupling force to the top electrode.

Each of the plurality of nanoposts may include a body having a nano-diameter and extending in a longitudinal direction between the substrate and the top electrode, an upper reinforcement having a larger cross-sectional area compared to the body at an upper part of the nanopost in contact with the top electrode, to increase coupling force to the top electrode, and a lower reinforcement having a larger cross-sectional area compared to the body at a lower part of the nanopost in contact with the substrate, to increase coupling force to the substrate.

A cross-sectional area of the upper reinforcement may be gradually increased in a direction from the body toward the top electrode, and a cross-sectional area of the lower reinforcement may be gradually increased in a direction from the body toward the substrate.

Each of the plurality of nanoposts may include a multi-layer structure of a plurality of different monocrystalline materials to adjust a ratio of stretchability and compressibility of the nanopost.

The plurality of monocrystalline materials may at least include a piezoelectric material capable of vibrating when an electrical signal is received.

The plurality of nanoposts may have a plurality of diameters, and a diameter of at least one first nanopost provided at a center portion of the top electrode may be greater than the diameter of at least one second nanopost provided at an edge portion of the top electrode.

A density of the plurality of nanoposts may be greater at a center portion compared to an edge portion of the top electrode.

The CMUT may further include a protrusion provided on the substrate to be spaced apart from the top electrode and to surround and be spaced apart from lower parts of the plurality of nanoposts, the substrate may be made of a conductive material to function as a bottom electrode, and the protrusion and the plurality of nanoposts may be formed by etching the substrate.

The CMUT may further include a bottom plate provided on the substrate in the gap to be spaced apart from the top electrode and to surround and be spaced apart from at least lower parts of the plurality of nanoposts, the substrate may be made of an insulating material, and the bottom plate may be made of a conductive material to function as a bottom electrode.

The top electrode may include a nanoplate coupled to the supporter and the plurality of nanoposts, and the CMUT may further include a top plate reinforcement on the nanoplate.

The top plate reinforcement may include a plurality of recesses or holes alternating with the plurality of nanoposts, and, when power is applied between the nanoplate and the bottom plate, on the whole, the nanoplate may operate at a first frequency by the plurality of nanoposts and parts of the nanoplate under the plurality of recesses or holes may operate at a second frequency.

According to another aspect of the present invention, there is provided a capacitive micromachined ultrasonic transducer (CMUT) including an insulating first substrate, a conductive second substrate provided on the first substrate, including a plurality of through holes, and functioning as a bottom electrode, a top electrode provided on the second substrate to be spaced apart from the second substrate, a supporter made of an insulating material and extending on the first substrate over the second substrate to define a gap between the first substrate and the top electrode and to support and fix an edge of the top electrode, and a plurality of nanoposts having both ends coupled and fixed to the first substrate and the top electrode though the plurality of through holes in the gap and being stretchable and compressible in a longitudinal direction to at least vertically move the top electrode when power is applied between the top electrode and the bottom electrode.

The top electrode may include a nanoplate, and the CMUT may further include a top plate reinforcement on the nanoplate.

The top plate reinforcement may include a plurality of recesses or holes alternating with the plurality of nanoposts, and, when power is applied between the nanoplate and the second substrate, on the whole, the nanoplate may operate at a first frequency by the plurality of nanoposts and parts of the nanoplate under the plurality of recesses or holes may operate at a second frequency different from the first frequency.

BRIEF DESCRIPTION OF THE DRAWINGS

The above and other features and advantages of the present invention will become more apparent by describing in detail embodiments thereof with reference to the attached drawings in which.

DETAILED DESCRIPTION

Figure 1:
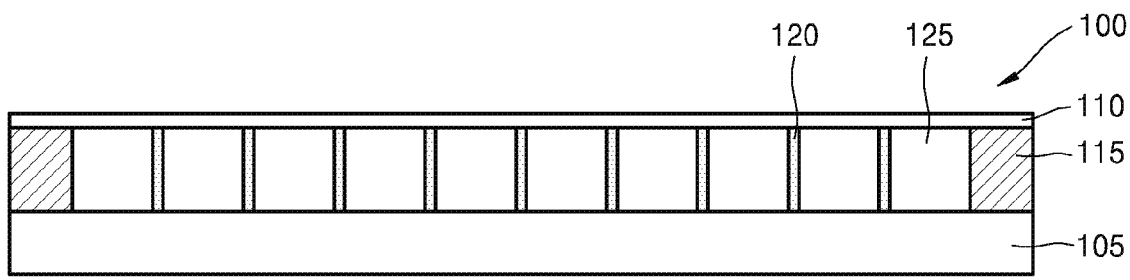
FIG. 1 is a cross-sectional view of a capacitive micromachined ultrasonic transducer (CMUT) according to an embodiment of the present invention.

Hereinafter, the present invention will be described in detail by explaining embodiments of the invention with reference to the attached drawings.

The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. In the drawings, the thicknesses or sizes of layers are exaggerated for clarity and convenience of explanation.

Figure 2:
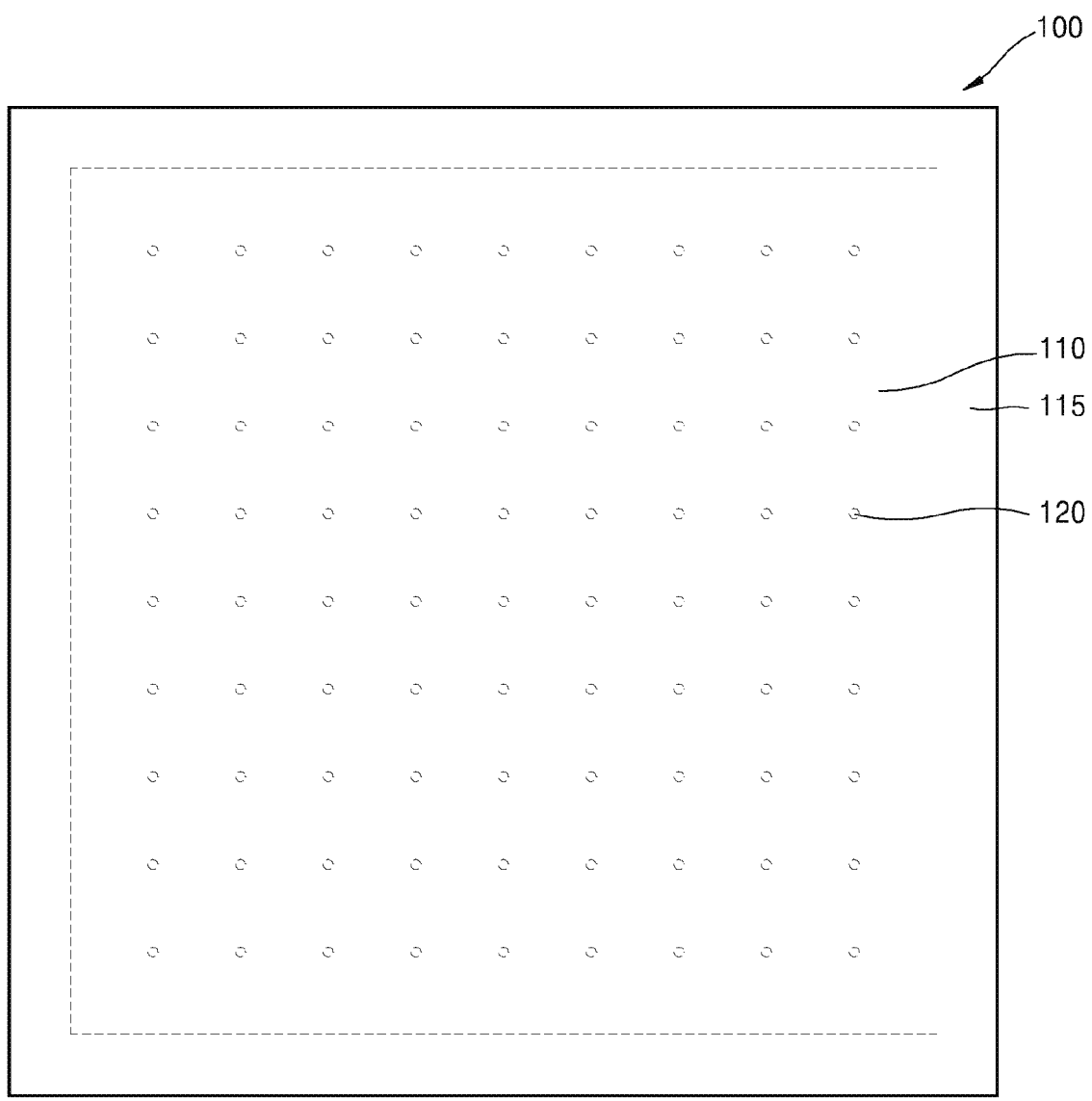
FIG. 2 is a plan view of the CMUT of FIG. 1.

FIG. 1 is a cross-sectional view of a capacitive micromachined ultrasonic transducer (CMUT) 100 according to an embodiment of the present invention. FIG. 2 is a plan view of the CMUT 100 of FIG. 1.

Referring to FIGS. 1 and 2, the CMUT 100 may include a substrate 105, a top electrode 110, a supporter 115, and a plurality of nanoposts 120.

The substrate 105 may have conductivity and function as a counter electrode to the top electrode 110, e.g., a bottom electrode. For example, the substrate 105 may include a semiconductor material, e.g., silicon, germanium, or silicon-germanium. The semiconductor material may be doped with n-type or p-type impurities to have conductivity. Furthermore, the substrate 105 may be provided by processing a semiconductor wafer to a certain thickness.

The top electrode 110 may be provided on the substrate 105 to be spaced apart from the substrate 105. For example, the top electrode 110 may be supported by the supporter 115 to be spaced apart from the substrate 105 by a certain distance. The top electrode 110 may be provided as a conductive plate and function as a moving plate in the CMUT 100. For example, the top electrode 110 may be provided as a conductive layer, e.g., a metalized layer or semiconductor layer, having a certain thickness. The semiconductor layer may be doped with n-type or p-type impurities to have conductivity.

The supporter 115 may be made of an insulating material and support and fix the edge of the top electrode 110. For example, the supporter 115 may be provided in a loop structure wound along the edge of the top electrode 110 and be coupled to the substrate 105 and the edge of the top electrode 110. As such, a gap 125 may be defined between the substrate 105 and the top electrode 110. The gap 125 may be sealed from an external environment by the substrate 105, the top electrode 110, and the supporter 115. For example, when the gap 125 is formed in a vacuum atmosphere, the gap 125 may be sealed and maintained in a vacuum state.

The nanoposts 120 may have both ends coupled and fixed to the substrate 105 and the top electrode 110 in the gap 125. For example, the top electrode 110 may be bonded to the substrate 105, which is provided as a semiconductor layer on another substrate and on which the nanoposts 120 and the supporter 115 are provided and the gap 125 is defined, and thus be coupled to the nanoposts 120 and the supporter 115. As another example, the top electrode 110 may be provided on the nanoposts 120 and the supporter 115 and then the gap 125 may be formed by removing a sacrificial material in the gap 125 by using wet etching or the like.

The nanoposts 120 may be spaced apart from each other at certain intervals in the gap 125. The intervals between the nanoposts 120 may be set uniformly or non-uniformly according to the purpose thereof. For example, the nanoposts 120 may be appropriately provided considering supporting forces thereof to move the top electrode 110 in a flat state without being bent. Based on this structure, because only the edge of the top electrode 110 is fixed by the supporter 115 and the entirety of a remaining part of the top electrode 110 exposed by the gap 125 is vertically movable together with the nanoposts 120, an average displacement may be greatly increased compared to existing technology.

Figure 3:
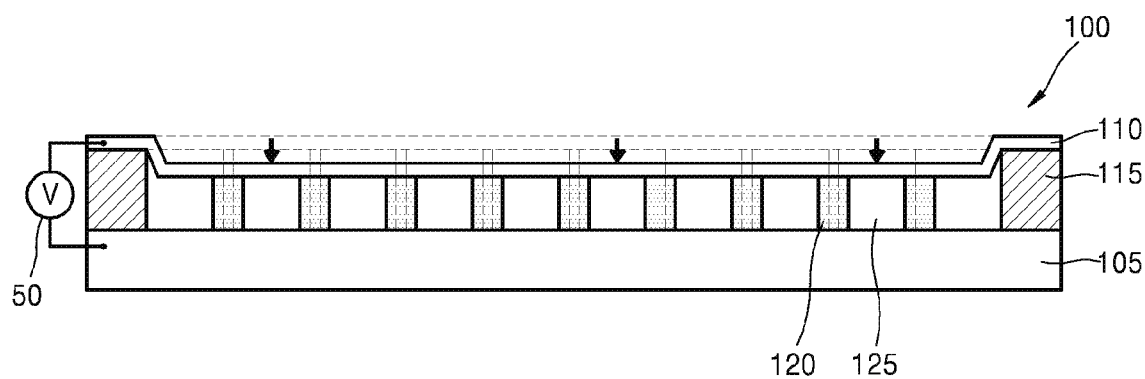
FIG. 3 is a cross-sectional view showing operation of the CMUT of FIG. 1.

As illustrated in FIG. 3, the nanoposts 120 may be provided to be compressible and stretchable in a longitudinal direction to at least vertically move the top electrode 110 when power 50 is applied to the top electrode 110. That is, the nanoposts 120 may serve as springs to vertically move the top electrode 110 while the edge of the top electrode 110 is being fixed. For example, the nanoposts 120 may be made of a semiconductor material. It is known that semiconductor single crystals exhibit a low stretchability and compressibility in a bulk structure but monocrystalline wires having a nanometer-level diameter may be compressed and stretched by about 20% corresponding to a theoretical limit.

The nanoposts 120 may be provided in various shapes at a nano level. For example, the nanoposts 120 may have a cylinder shape, an elliptical cylinder shape, or a polygonal prism shape (e.g., a triangular prism shape, a rectangular prism shape, or a pentagonal prism shape), or have a partially hollow shape of the above-mentioned shape. For example, when holes are provided in the nanoposts 120 like the latter example, lateral restraint thereof may be reduced and thus a higher stretchability and compressibility may be provided. For example, the nanoposts 120 may be formed by processing a semiconductor wafer by using a semiconductor process, e.g., a lithography process or an etching process.

For example, the nanoposts 120 may be made of a single monocrystalline semiconductor material. For example, the nanoposts 120 may be formed integrally with the substrate 105 by patterning the same material as the substrate 105. As another example, the nanoposts 120 may include a multilayer structure of a plurality of different monocrystalline materials to adjust a ratio of stretchability and compressibility thereof. In this case, the monocrystalline materials may include, for example, silicon (Si), germanium (Ge), silicon carbide (SiC), and a piezoelectric material. The piezoelectric material is a material capable of vibrating when an electrical signal is received and of outputting an electrical signal when vibration is received, and may include, for example, lead magnesium niobate-lead titanate (PMN-PT), lead magnesium niobate-lead zirconate titanate (PMN-PZT), or zinc oxide (ZnO). For example, using at least one piezoelectric material, the nanoposts 120 may simultaneously utilize electrostatic force, and stretchability and compressibility due to the piezoelectric material and thus an operating frequency range of the CMUT 100 may be increased.

As illustrated in FIG. 3, when the power 50, e.g., radio-frequency (RF) power within a certain frequency range, is applied between the top electrode 110 and the substrate 105, the nanoposts 120 may be compressed and stretched to vibrate by electrostatic force due to capacitive coupling between the two and thus ultrasonic waves may be transmitted. On the contrary, when ultrasonic waves reflected from an object are incident on the CMUT 100 from the outside, the nanoposts 120 may be compressed and stretched to move the top electrode 110 and to change a capacitance and thus ultrasonic vibration may be received.

In some embodiments, the substrate 105 may include a semiconductor wafer and an integrated circuit (IC) provided on the semiconductor wafer. The nanoposts 120 may be monolithically formed on the substrate 105 by using a semiconductor process. That is, the IC may be provided on the semiconductor wafer and the nanoposts 120 may be formed by performing thereon a semiconductor process such as a deposition process or an etching process. The top electrode 110 may be provided on the nanoposts 120 by using a bonding process.

Based on the CMUT 100 according to the current embodiment, unlike existing technology, because displacements are achievable using most of the area of the top electrode 110, an average displacement may be increased and thus transmission and reception sensitivity of an ultrasonic signal may be greatly increased. Furthermore, a usable frequency range may be increased by providing the nanoposts 120 in a multilayer structure of different materials.

FIGS. 4A to 4D are cross-sectional views of CMUTs 100a to 100d according to other embodiments of the present invention. The CMUTs 100a to 100d according to the current embodiments are partially modified from the above-described CMUT 100 of FIGS. 1 to 3 and thus a repeated description thereof is not provided herein.

Figure 4A:
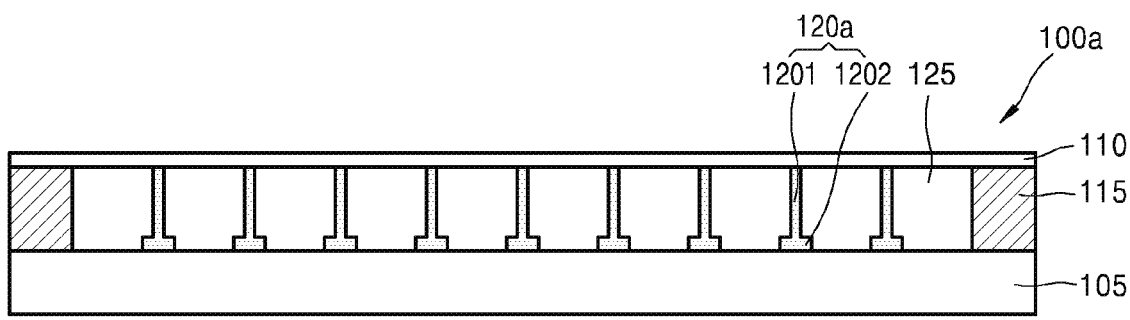
FIGS. 4A to 4D are cross-sectional views of CMUTs according to other embodiments of the present invention.

Referring to FIG. 4A, each of nanoposts 120a may include a body 1201 and a lower reinforcement 1202. For example, the body 1201 may be a structure having a nano-diameter and extending in a longitudinal direction between the substrate 105 and the top electrode 110, and the lower reinforcement 1202 may be provided with a larger cross-sectional area compared to the body 1201 at a lower part of the nanopost 120a in contact with the substrate 105, to increase coupling force to the substrate 105. Based on this structure, when the substrate 105 is etched to form the nanoposts 120a, weakening of lower parts of the nanoposts 120a and separation of the nanoposts 120a from a lower layer, e.g., the substrate 105, may be prevented.

Figure 4B:
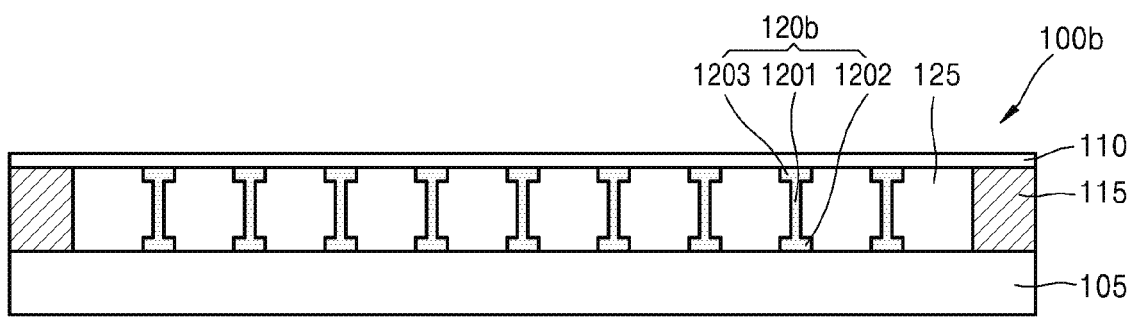

Referring to FIG. 4B, each of nanoposts 120b may include the body 1201, the lower reinforcement 1202, and an upper reinforcement 1203. For example, the lower reinforcement 1202 may be provided with a larger cross-sectional area compared to the body 1201 at a lower part of the nanopost 120b in contact with the substrate 105, to increase coupling force to the substrate 105, and the upper reinforcement 1203 may be provided with a larger cross-sectional area compared to the body 1201 at an upper part of the nanopost 120b in contact with the top electrode 110, to increase coupling force to the top electrode 110. As such, the nanoposts 120b may be firmly coupled to the top electrode 110 and the substrate 105 on and under the nanoposts 120b, and thus separation of the nanoposts 120b from upper and lower layers may be prevented even when the nanoposts 120b are repeatedly compressed and stretched.

Figure 4C:
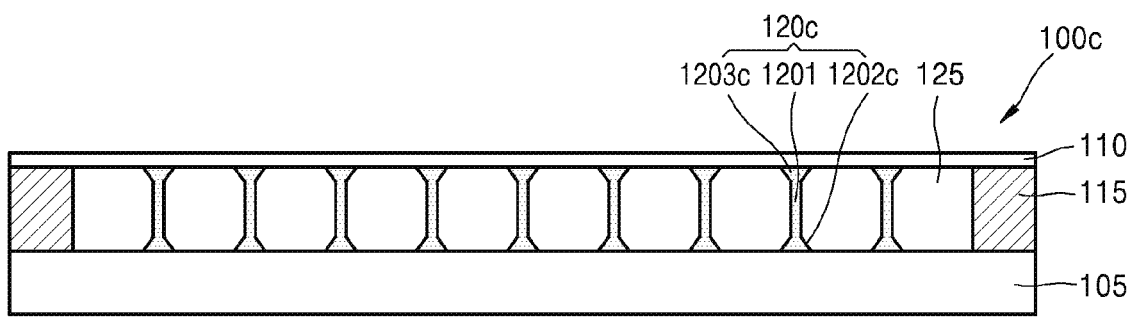

Referring to FIG. 4C, each of nanoposts 120c may include the body 1201, a lower reinforcement 1202c, and an upper reinforcement 1203c. A cross-sectional area of the lower reinforcement 1202c may be gradually increased in a linear manner in a direction from the body 1201 toward the substrate 105, and a cross-sectional area of the upper reinforcement 1203c may be gradually increased in a linear manner in a direction from the body 1201 toward the top electrode 110. As such, the body 1201 may be smoothly connected to the lower reinforcement 1202c and the upper reinforcement 1203c. This structure may be formed using dry etching.

Figure 4D:
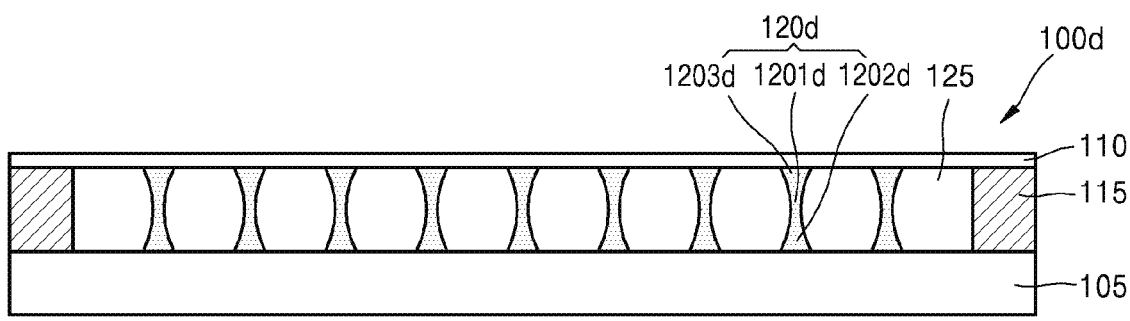

Referring to FIG. 4D, each of nanoposts 120*d* may include the body 1201, a lower reinforcement 1202*d*, and an upper reinforcement 1203*d*. A cross-sectional area of the lower reinforcement 1202*d* may be gradually increased in a curvilinear manner in a direction from the body 1201 toward the substrate 105, and a cross-sectional area of the upper reinforcement 1203*d* may be gradually increased in a curvilinear manner in a direction from the body 1201 toward the top electrode 110. As such, the body 1201 may be smoothly connected to the lower reinforcement 1202*d* and the upper reinforcement 1203*d*. This structure may be formed using wet etching.

Figure 5:
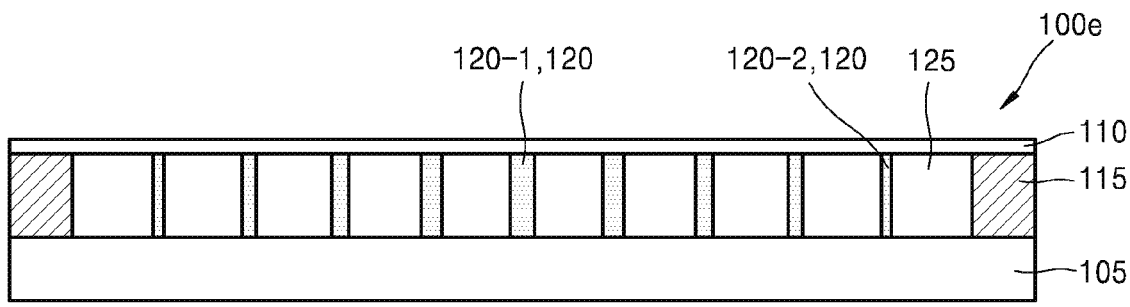
FIG. 5 is a cross-sectional view of a CMUT according to another embodiment of the present invention.
Figure 6:
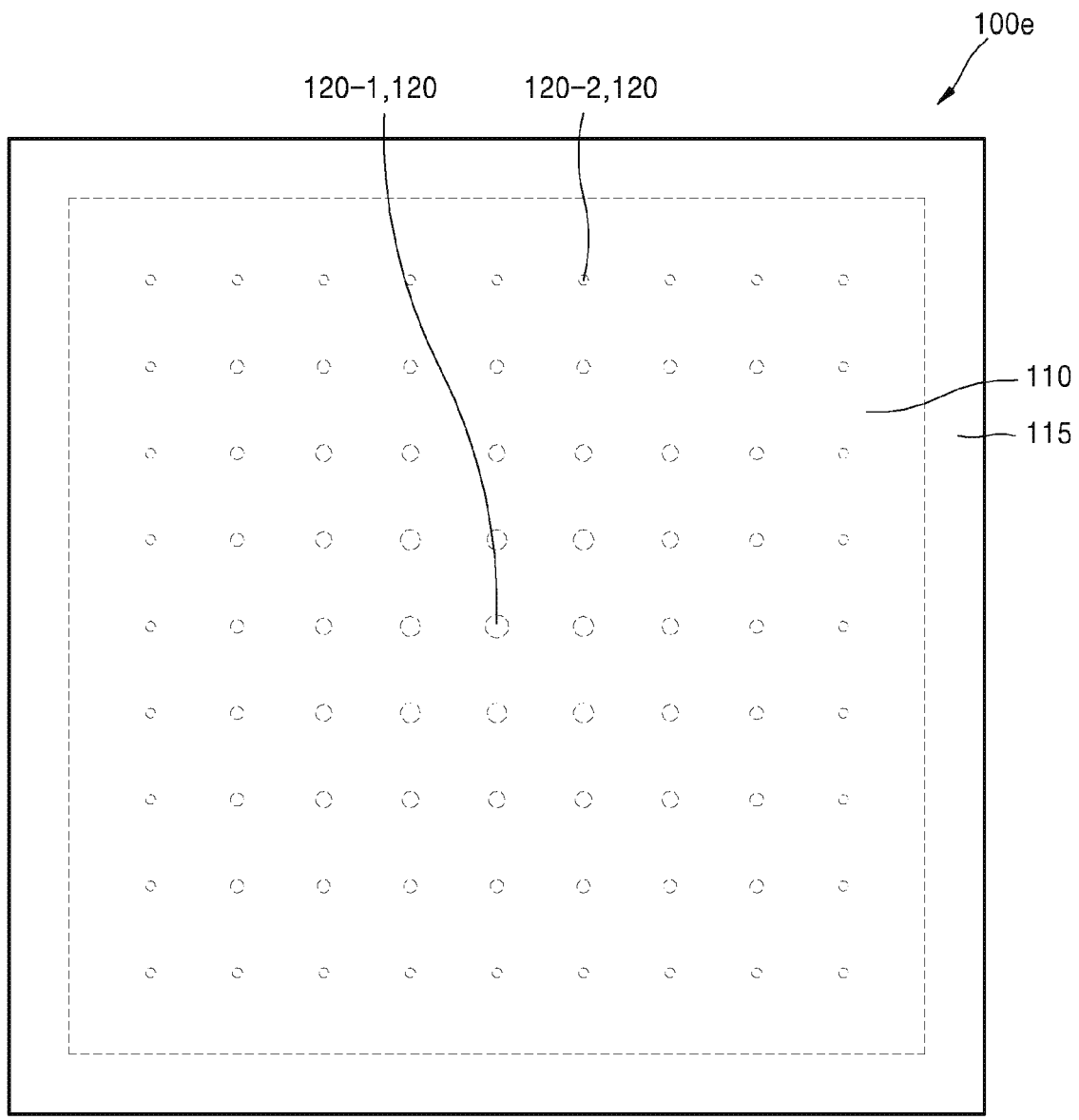
FIG. 6 is a plan view of the CMUT of FIG. 5.

FIG. 5 is a cross-sectional view of a CMUT 100*e* according to another embodiment of the present invention, and FIG. 6 is a plan view of the CMUT 100*e* of FIG. 5. The CMUT 100*e* according to the current embodiment is modified from the CMUT 100 of FIGS. 1 to 3 and thus a repeated description thereof is not provided herein.

Referring to FIGS. 5 and 6, in the CMUT 100*e*, the nanoposts 120 may have a plurality of diameters. For example, the nanoposts 120 may have different diameters at center and edge portions of the substrate 105 or the top electrode 110. For example, a diameter of at least one first nanopost 120-1, 120 provided at the center portion of the top electrode 110 may be greater than the diameter of at least one second nanopost 120-2, 120 provided at the edge portion of the top electrode 110. Furthermore, the diameter of the nanoposts 120 may be reduced gradually or stepwise from the center portion toward the edge portion of the top electrode 110.

Because the top electrode 110 is supported and fixed by the supporter 115 at the edge thereof and has a lower supporting force at the center portion thereof, rigidity of the first nanopost 120-1, 120 provided at the center portion may be increased by increasing the diameter thereof.

In the CMUT 100*e* according to the current embodiment, the nanoposts 120 may be further modified to have the structures of the nanoposts 120*a* to 120*d* of FIGS. 4A to 4D.

Figure 7:
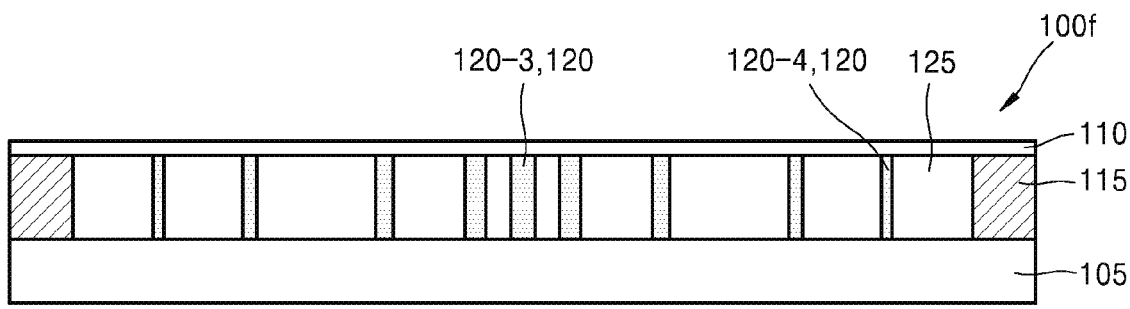
FIG. 7 is a cross-sectional view of a CMUT according to another embodiment of the present invention.
Figure 8:
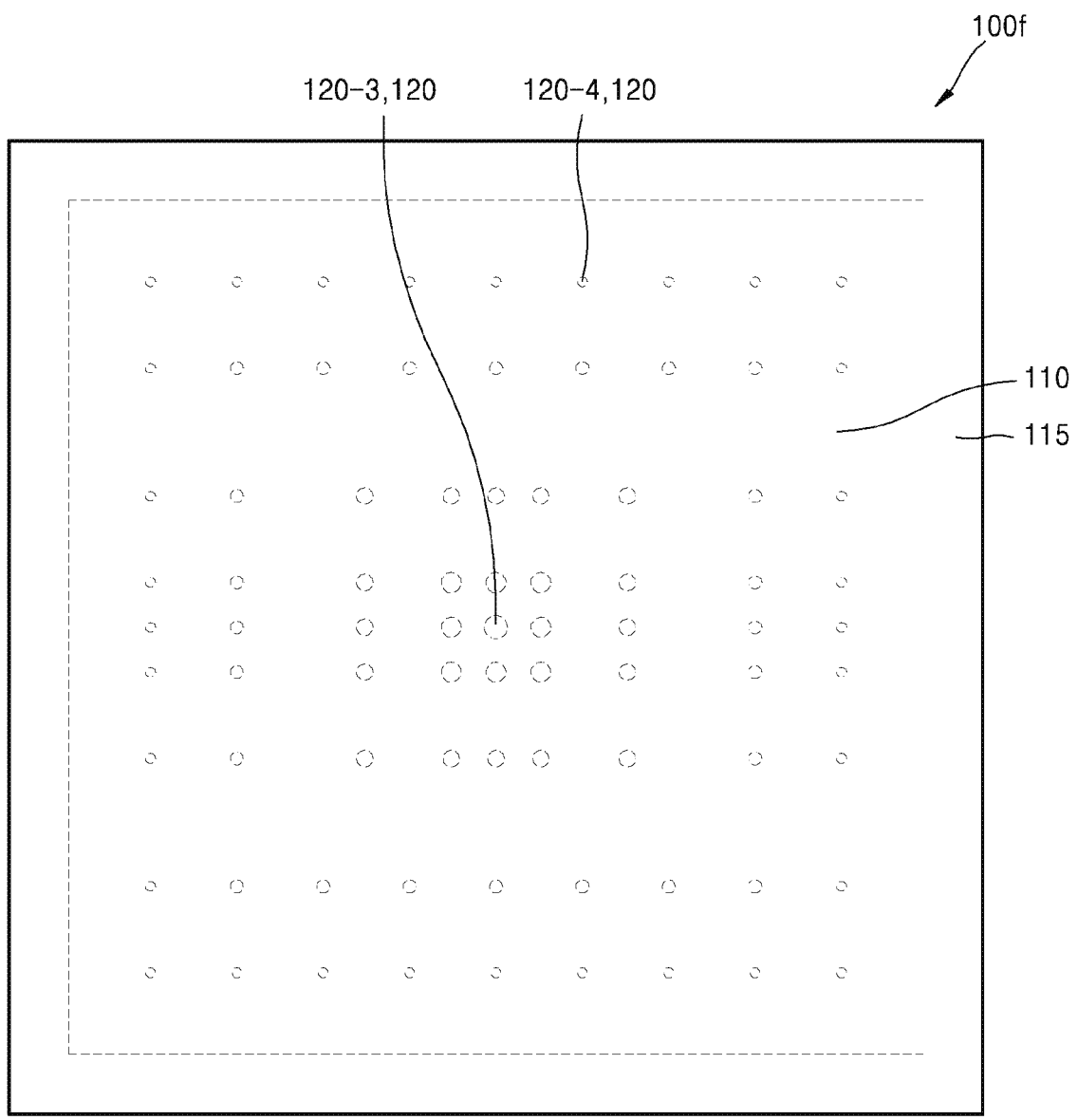
FIG. 8 is a plan view of the CMUT of FIG. 7.

FIG. 7 is a cross-sectional view of a CMUT 100*f* according to another embodiment of the present invention, and FIG. 8 is a plan view of the CMUT 100*f* of FIG. 7. The CMUT 100*f* according to the current embodiment is modified from the CMUT 100 of FIGS. 1 to 3 and thus a repeated description thereof is not provided herein.

Referring to FIGS. 7 and 8, in the CMUT 100*f*, a density of the nanoposts 120 may be greater at a center portion compared to an edge portion of the substrate 105 or the top electrode 110. For example, a density of third nanoposts 120-3, 120 provided at the center portion of the top electrode 110 may be greater than the density of fourth nanoposts 120-4, 120 provided at the edge portion of the top electrode 110. Furthermore, the density of the nanoposts 120 may be reduced gradually or stepwise from the center portion toward the edge portion of the top electrode 110.

To move the top electrode 110 in a flat state without being bent, a low supporting force of the third nanoposts 120-3, 120 provided at the center portion may be increased by increasing the density thereof.

In the CMUT 100*f* according to the current embodiment, the nanoposts 120 may be further modified to have the structures of the nanoposts 120*a* to 120*d* of FIGS. 4A to 4D.

Figure 9:
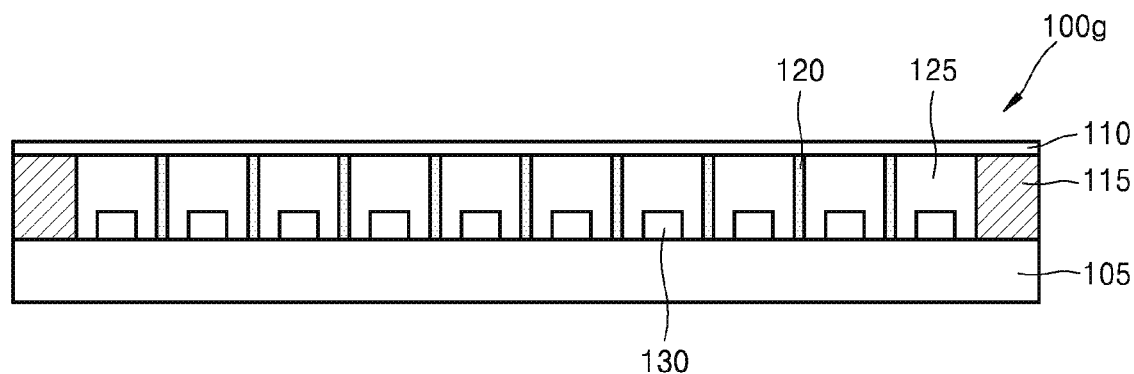
FIG. 9 is a cross-sectional view of a CMUT according to another embodiment of the present invention.
Figure 10:
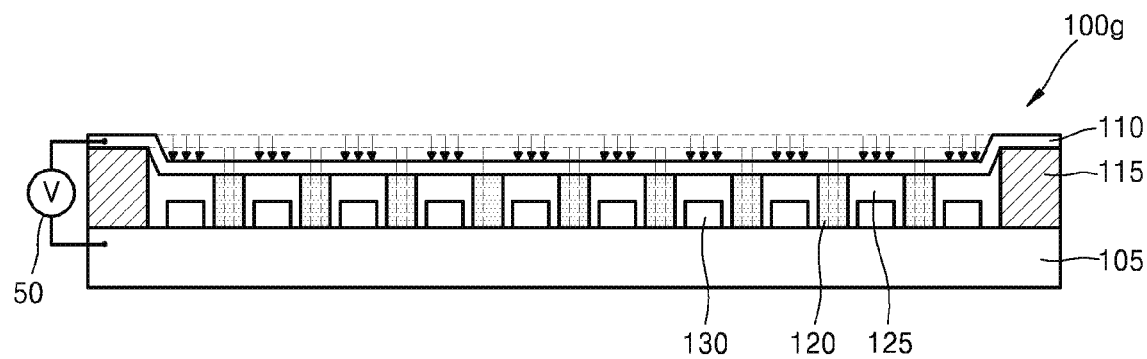
FIG. 10 is a cross-sectional view showing operation of the CMUT of FIG. 9.

FIG. 9 is a cross-sectional view of a CMUT 100*g* according to another embodiment of the present invention, and FIG. 10 is a cross-sectional view showing operation of the CMUT 100*g* of FIG. 9. The CMUT 100*f* according to the current embodiment is modified from the CMUT 100 of FIGS. 1 to 3 and thus a repeated description thereof is not provided herein.

Referring to FIGS. 9 and 10, the CMUT 100*g* may further include a protrusion 130 on the substrate 105. For example, the protrusion 130 may be provided on the substrate 105 to be spaced apart from the top electrode 110 and to surround at least lower parts of the nanoposts 120. For example, the protrusion 130 and the nanoposts 120 may be made of the same material as the substrate 105 and be formed by, for example, etching a single substrate 105.

Based on this structure, a capacitance value may be adjusted by maintaining a height of the nanoposts 120 to be equal to that in the CMUT 100 of FIG. 1, i.e., by constantly maintaining a height of the gap 125, and by reducing a distance between the top electrode 110 and the protrusion 130 functioning as a part of a bottom electrode. In this structure, when the power 50 is applied between the top electrode 110 and the substrate 105, capacitive coupling may occur between the top electrode 110 and the substrate 105 and between the top electrode 110 and the protrusion 130, and the nanoposts 120 may be compressed to move the top electrode 110.

In the CMUT 100*g* according to the current embodiment, the nanoposts 120 may be further modified to have the structures of the nanoposts 120*a* to 120*d* of FIGS. 4A to 4D or to have the diameters or densities of the nanoposts 120 of FIGS. 5 to 8.

Figure 11:
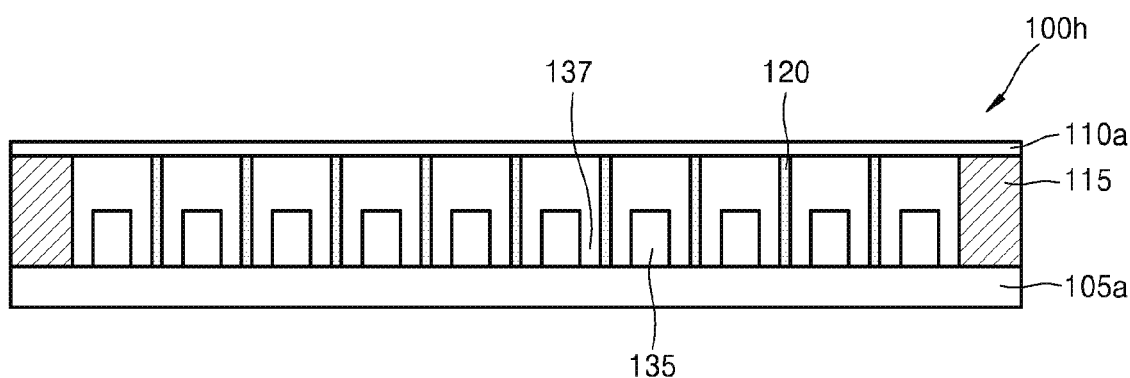
FIG. 11 is a cross-sectional view of a CMUT according to another embodiment of the present invention.
Figure 12:
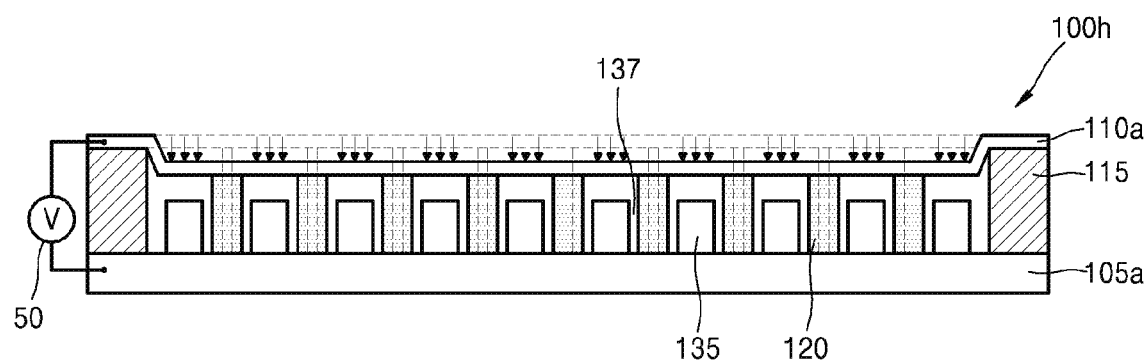
FIG. 12 is a cross-sectional view showing operation of the CMUT of FIG. 11.

FIG. 11 is a cross-sectional view of a CMUT 100*h* according to another embodiment of the present invention, and FIG. 12 is a cross-sectional view showing operation of the CMUT 100*h* of FIG. 11. The CMUT 100*h* according to the current embodiment is partially modified from the CMUT 100 of FIGS. 1 to 3 and the CMUT 100*g* of FIGS. 9 and 10 and thus a repeated description thereof is not provided herein.

Referring to FIGS. 11 and 12, a substrate 105*a* may be made of an insulating material and a bottom plate 135 may be provided on the substrate 105*a*. The bottom plate 135 may be provided on the substrate 105*a* in the gap 125 to be spaced apart from a top electrode 110*a* and to surround and be spaced apart from at least lower parts of the nanoposts 120. For example, the bottom plate 135 may be made of a conductive material to function as a bottom electrode, and include a plurality of through holes 137. The bottom plate 135 may be made of, for example, a semiconductor material and be formed by, for example, etching a semiconductor wafer. For example, the top electrode 110*a* may be provided as a nanoplate having a nano-thickness and, in the current embodiment, the top electrode 110*a* may also be called a nanoplate 110*a*.

Based on the CMUT 100*h*, a parasitic capacitance may be reduced by separating the nanoposts 120 from the bottom electrode, i.e., the bottom plate 135. Furthermore, based on this structure, a length of the nanoposts 120, i.e., a height of the gap 125, may be adjusted independently of the bottom plate 135, and the gap 125 between the bottom plate 135 and the top electrode 110*a* may be adjusted independently of the height of the nanoposts 120.

Considering functions and forming processes, the substrate 105*a* may also be called an insulating first substrate and the bottom plate 135 may also be called a conductive second substrate. In this regard, the second substrate may be provided on the first substrate to function as the bottom electrode. The top electrode 110*a* may be provided on the second substrate to be spaced apart from the second substrate. The supporter 115 may extend on the first substrate over the second substrate to define the gap 125 between the first substrate and the top electrode 110a and to support and fix the edge of the top electrode 110a. The nanoposts 120 may have both ends coupled and fixed to the first substrate and the top electrode 110a though the plurality of through holes 137 in the gap 125, and be stretchable and compressible in a longitudinal direction to at least vertically move the top electrode 110a when power is applied between the top electrode 110a and the bottom electrode.

In the CMUT 100h according to the current embodiment, the nanoposts 120 may be further modified to have the structures of the nanoposts 120a to 120d of FIGS. 4A to 4D or to have the diameters or densities of the nanoposts 120 of FIGS. 5 to 8.

Figure 13:
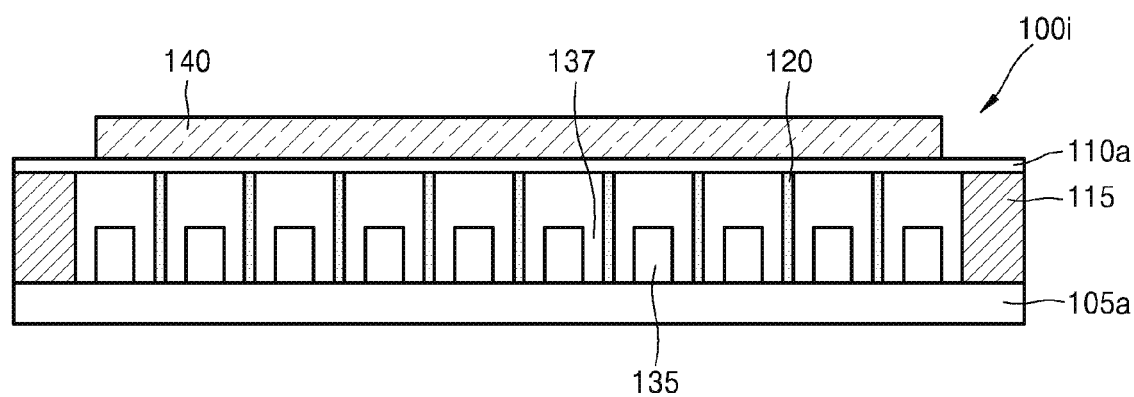
FIG. 13 is a cross-sectional view of a CMUT according to another embodiment of the present invention.
Figure 14:
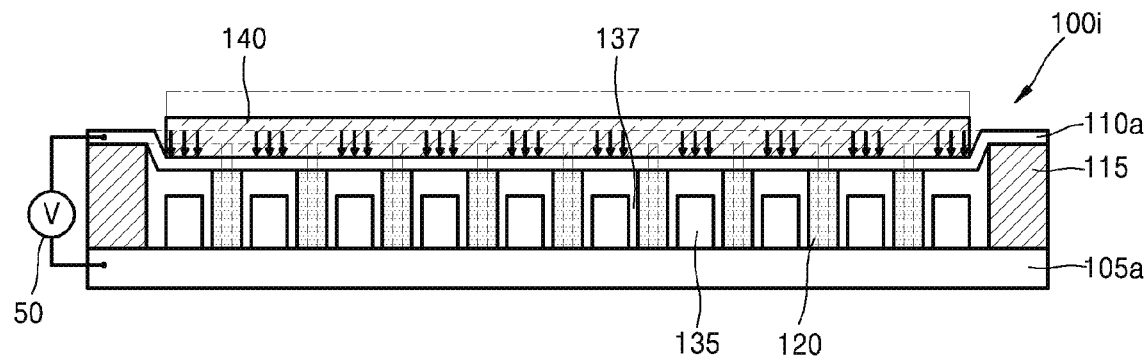
FIG. 14 is a cross-sectional view showing operation of the CMUT of FIG. 13.

FIG. 13 is a cross-sectional view of a CMUT 100i according to another embodiment of the present invention, and FIG. 14 is a cross-sectional view showing operation of the CMUT 100i of FIG. 13. The CMUT 100i according to the current embodiment is partially modified from the CMUT 100h of FIGS. 11 and 12 and thus a repeated description thereof is not provided herein.

Referring to FIGS. 13 and 14, a top plate reinforcement 140 may be added onto the nanoplate 110a functioning as a top electrode. The top plate reinforcement 140 may structurally reinforce the nanoplate 110a to prevent the nanoplate 110a from being bent while being moved by the nanoposts 120. Based on this structure, the nanoplate 110a may vertically move in a flat state while being supported and fixed by the supporter 115 at the edge thereof and being structurally reinforced by the top plate reinforcement 140.

Figure 15:
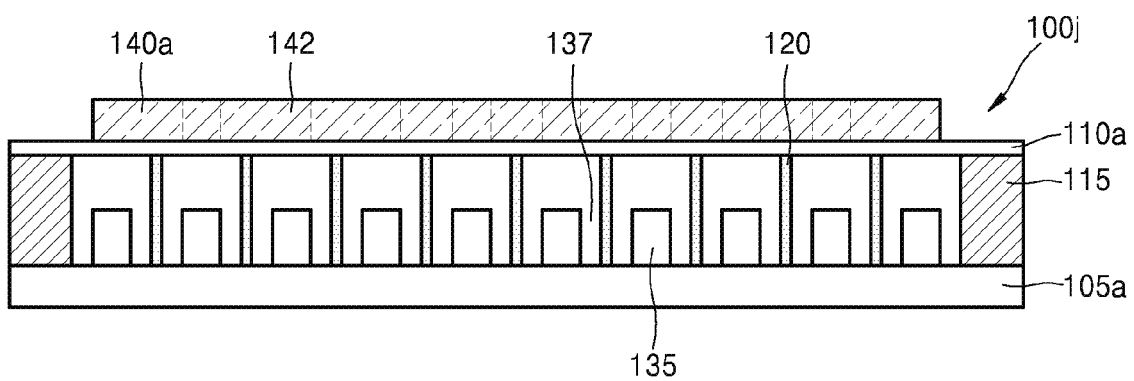
FIG. 15 is a cross-sectional view of a CMUT according to another embodiment of the present invention.
Figure 16:
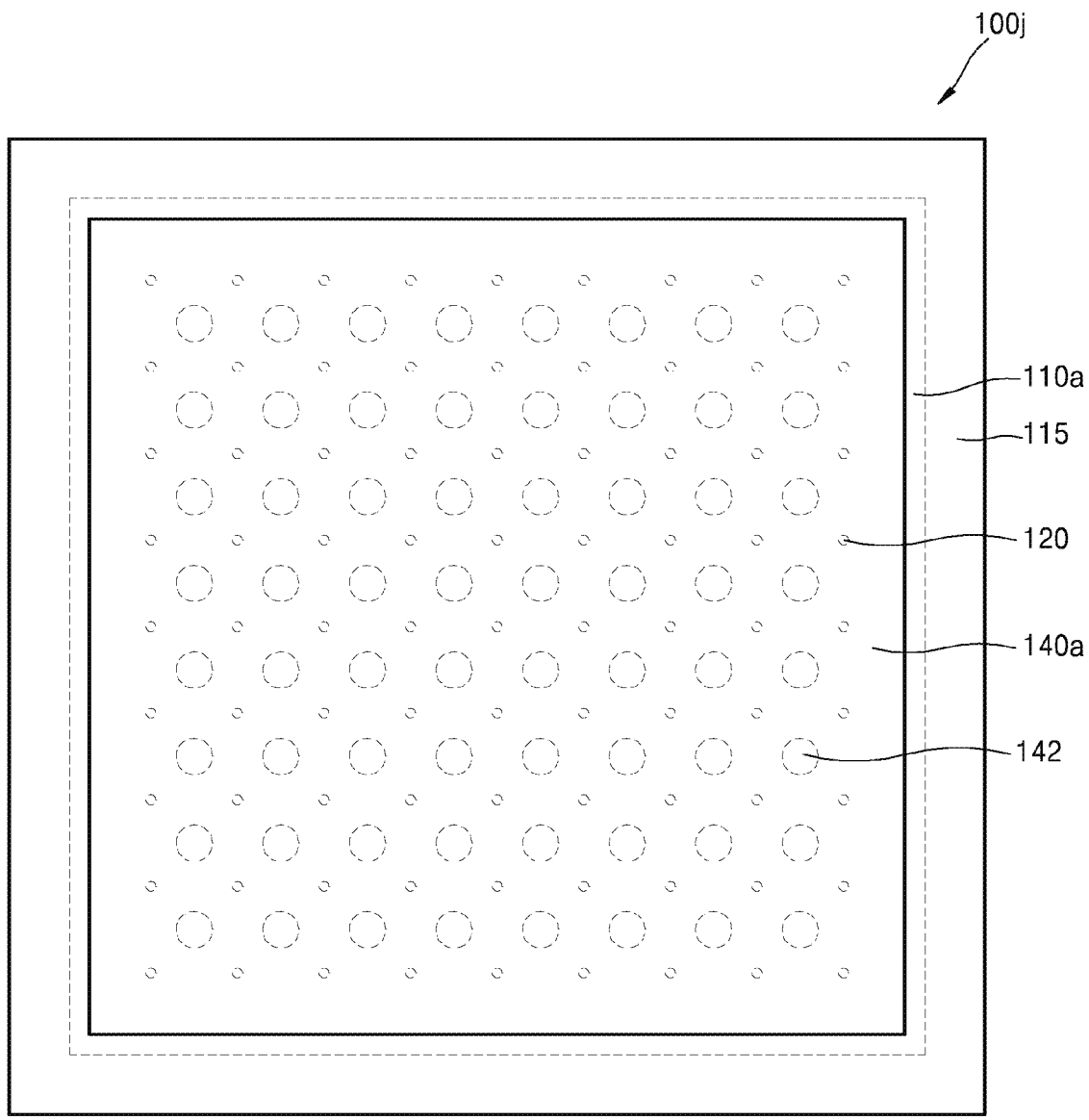
FIG. 16 is a plan view of the CMUT of FIG. 15.

FIG. 15 is a cross-sectional view of a CMUT 100j according to another embodiment of the present invention, and FIG. 16 is a plan view of the CMUT 100j of FIG. 15. The CMUT 100j according to the current embodiment is partially modified from the CMUT 100i of FIGS. 13 and 14 and thus a repeated description thereof is not provided herein.

Referring to FIGS. 15 and 16, in the CMUT 100j, a top plate reinforcement 140a may include a plurality of holes 142. The holes 142 may alternate with the nanoposts 120 in a plan view of the top plate reinforcement 140a. Based on this structure, parts of the nanoplate 110a exposed by the holes 142 may vibrate separately from spring motion of the nanoposts 120. The holes 142 may be provided in various shapes, e.g., a circular shape, an elliptical shape, a polygonal shape, or a hollow shape.

Figure 17:
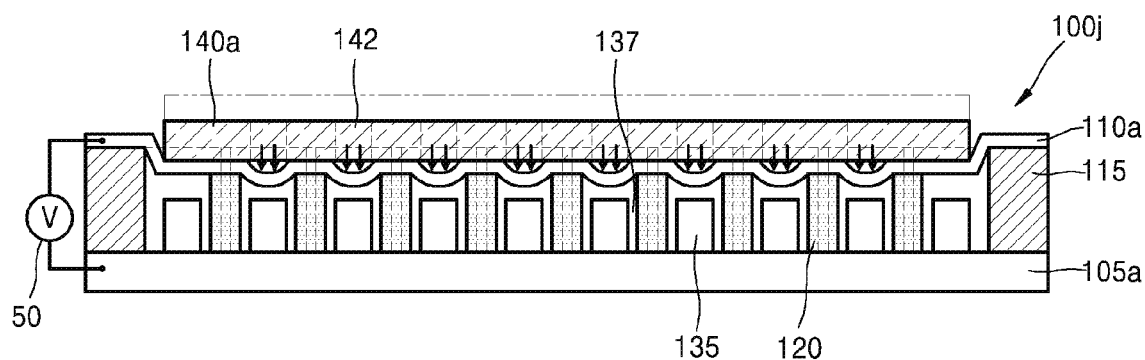
FIGS. 17 and 18 are cross-sectional views showing operation of the CMUT of FIG. 15.

As illustrated in FIG. 17, when power of a first frequency is applied between the nanoplate 110a and the bottom plate 135, on the whole, the nanoplate 110a may operate at the first frequency by the nanoposts 120. That is, the nanoposts 120 may be compressed and stretched and thus the nanoplate 110a coupled to the nanoposts 120 may vertically move together with the top plate reinforcement 140a. Otherwise, when power of a second frequency is applied between the nanoplate 110a and the bottom plate 135, the parts of the nanoplate 110a exposed by the holes 142 may operate at the second frequency. The first frequency and the second frequency are basically different in that different parts move, but may also be designed to be the same.

Figure 18:
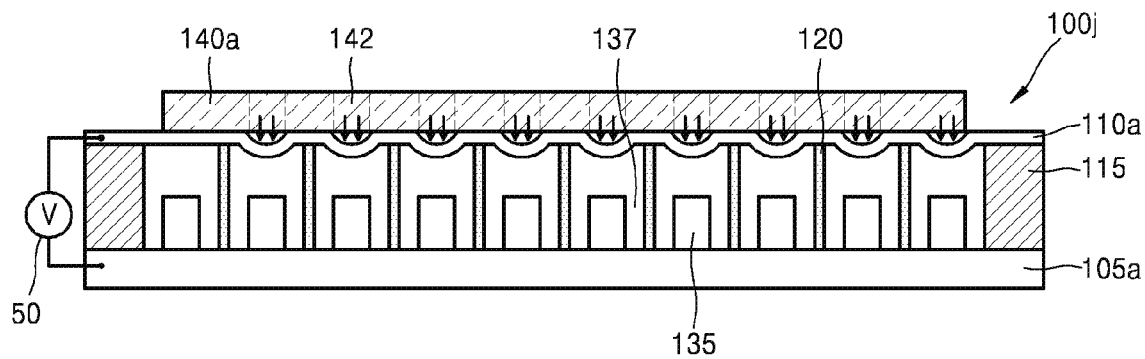

As illustrated in FIG. 18, in a second frequency band, the parts of the nanoplate 110a exposed by the holes 142 may independently operate at the second frequency without operation of the nanoposts 120 independently of motion of the nanoposts 120.

Therefore, the CMUT 100j may operate at multiple frequencies such as the first frequency and the second frequency. Furthermore, wideband-frequency operation corresponding to a sum of the first frequency and the second frequency may be implemented by adjusting an interval of the first frequency and the second frequency. Besides, operation at two or more frequencies may be implemented by changing the structure and shape of the top plate reinforcement 140a. Although existing medical imaging technology uses a plurality of CMUTs of different operating frequency ranges because different body parts have different operating frequencies, the CMUT 100j according to the current embodiment may operate at multiple frequencies in a wideband and thus may image various body parts by using one or a small number of CMUTs 100j by setting an operating frequency required by a circuit.

Figure 19:
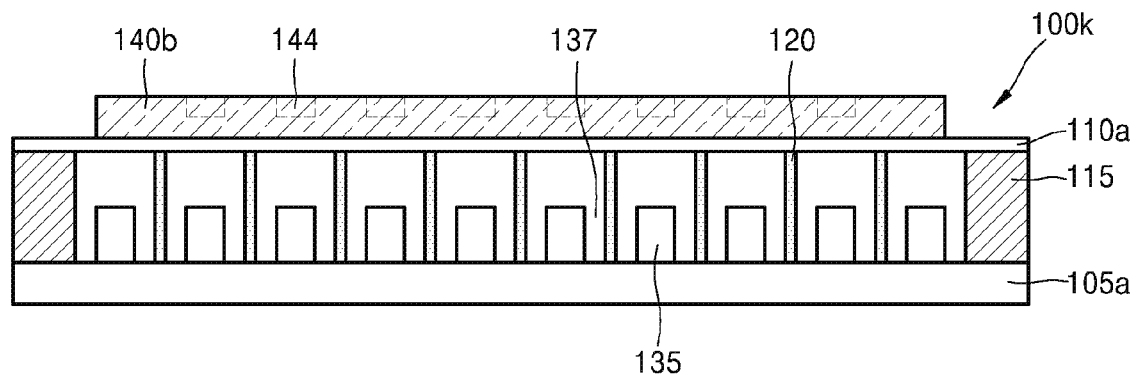
FIG. 19 is a cross-sectional view of a CMUT according to another embodiment of the present invention.

FIG. 19 is a cross-sectional view of a CMUT 100k according to another embodiment of the present invention. The CMUT 100k according to the current embodiment is partially modified from the CMUT 100j of FIGS. 15 to 18 and thus a repeated description thereof is not provided herein.

Referring to FIG. 19, in the CMUT 100k, a top plate reinforcement 140b may include a plurality of recesses 144. The recesses 144 may alternate with the nanoposts 120 in a plan view of the top plate reinforcement 140b. The recesses 144 may be formed to a depth equal to or greater than a certain depth in such a manner that the bottom of the nanoplate 110a under the recesses 144 has a thickness equal to or less than a certain thickness to allow motion of parts of the nanoplate 110a under the recesses 144. Based on this structure, the parts of the nanoplate 110a under the recesses 144 may vibrate separately from spring motion of the nanoposts 120. The recesses 144 may be provided in various shapes, e.g., a circular shape, an elliptical shape, a polygonal shape, or a hollow shape.

According to the afore-described embodiments of the present invention, in a CMUT, transmission and reception sensitivity may be increased by increasing an average displacement between electrodes. Furthermore, the CMUT according to some embodiments of the present invention may operate at multiple frequencies and thus capture medical images by using one or a small number of CMUTs without changing CMUTs for different body parts. However, the scope of the present invention is not limited to the above-described effects.

While the present invention has been particularly shown and described with reference to embodiments thereof, it will be understood by one of ordinary skill in the art that various changes in form and details may be made therein without departing from the scope of the present invention as defined by the following claims.

What is claimed is:

1. A capacitive micromachined ultrasonic transducer (CMUT) comprising:
a substrate comprising a bottom electrode;
a top electrode provided over the substrate to be spaced above and apart from the substrate, the top electrode comprising a nanoplate having a nanometer-level thickness;
a supporter made of an insulating material, the supporter on a topmost surface of the substrate and in direct contact with a bottommost surface of the top electrode, the supporter extending along an outermost periphery of the substrate and the top electrode to define a continuous looped structure that supports and fixes an edge of the top electrode to an edge of the substrate and to define a gap between the topmost surface of the substrate, sidewalls of the supporter, and the bottommost surface of the top electrode, the gap comprising a vacuum sealed from an external environment by the substrate, the top electrode, and the supporter;

a plurality of nanoposts having a first end coupled and fixed directly to the topmost surface of the substrate and a second end in direct contact with the bottommost surface of the top electrode, the plurality of nanoposts in the gap vacuum sealed from the external environment, and being compressible and stretchable in a longitudinal direction to at least vertically move the top electrode when power is applied to the top electrode, wherein each of the plurality of nanoposts comprises a monocrystalline wire having a nanometer-level diameter of a semiconductor material; and a top plate reinforcement having a bottommost surface directly on a topmost surface of the top electrode opposite the plurality of nanoposts, the top plate reinforcement extending continuously over the plurality of nanoposts and positioned to prevent portions of the top electrode directly under the top plate reinforcement from bending while being vertically moved by the plurality of nanoposts, the bottommost surface above a topmost surface of the supporter when power is not applied to the top electrode and below the topmost surface of the supporter when power is applied to the top electrode, the top plate reinforcement comprising a plurality of holes vertically offset from and alternating with the plurality of nanoposts such that portions of the top electrode exposed by respective holes of the plurality of holes may vibrate separately from a spring motion of the plurality of nanoposts;

wherein, when power of a first frequency is applied between the top electrode and the bottom electrode, the plurality of nanoposts may be compressed and stretched and the top electrode coupled to the plurality of nanoposts may vertically move together with the top plate reinforcement; and wherein, when power of a second frequency is applied between the top electrode and the bottom electrode, the plurality of nanoposts do not compress or stretch and the portions of the top electrode exposed by respective holes of the plurality of holes operate at the second frequency independently of motion of the plurality of nanoposts.

2. The CMUT of claim 1, wherein each of the plurality of nanoposts comprises a lower reinforcement having a larger cross-sectional area compared to a body at a lower part of the nanopost in contact with the substrate, to increase coupling force to the substrate.

3. The CMUT of claim 1, wherein each of the plurality of nanoposts comprises an upper reinforcement having a larger cross-sectional area compared to a body at an upper part of the nanopost in contact with the top electrode, to increase coupling force to the top electrode.

4. The CMUT of claim 1, wherein each of the plurality of nanoposts comprises:

a body having a nano-diameter and extending in a longitudinal direction between the substrate and the top electrode;

an upper reinforcement having a larger cross-sectional area compared to the body at an upper part of the nanopost in contact with the top electrode, to increase coupling force to the top electrode; and a lower reinforcement having a larger cross-sectional area compared to the body at a lower part of the nanopost in contact with the substrate, to increase coupling force to the substrate.

5. The CMUT of claim 4, wherein a cross-sectional area of the upper reinforcement is gradually increased in a direction from the body toward the top electrode, and wherein a cross-sectional area of the lower reinforcement is gradually increased in a direction from the body toward the substrate.

6. The CMUT of claim 1, wherein each of the plurality of nanoposts comprises a multilayer structure of a plurality of different monocrystalline materials to adjust a ratio of stretchability and compressibility of the nanopost.

7. The CMUT of claim 6, wherein the plurality of monocrystalline materials at least comprise a piezoelectric material capable of vibrating when an electrical signal is received.

8. The CMUT of claim 1, wherein the plurality of nanoposts have a plurality of diameters, and wherein a diameter of at least one first nanopost provided at a center portion of the top electrode is greater than the diameter of at least one second nanopost provided at an edge portion of the top electrode.

9. The CMUT of claim 1, wherein a density of the plurality of nanoposts is greater at a center portion compared to an edge portion of the top electrode.

10. The CMUT of claim 1, further comprising a protrusion provided on the substrate to be spaced apart from the top electrode and to surround and be spaced apart from lower parts of the plurality of nanoposts, wherein the substrate is made of a conductive material to function as the bottom electrode, and wherein the protrusion and the plurality of nanoposts are formed by etching the substrate.

11. The CMUT of claim 1, further comprising a bottom plate provided on the substrate in the gap to be spaced apart from the top electrode and to surround and be spaced apart from at least lower parts of the plurality of nanoposts, wherein the substrate is made of an insulating material, and wherein the bottom plate is made of a conductive material to function as the bottom electrode.

12. The CMUT of claim 1, wherein the substrate comprises a semiconductor wafer and an integrated chip (IC) provided on the semiconductor wafer, and wherein the plurality of nanoposts are monolithically formed on the substrate by using a semiconductor process.

13. A capacitive micromachined ultrasonic transducer (CMUT) comprising:

an insulating first substrate;

a conductive second substrate provided on the first substrate, comprising a plurality of through holes, and functioning as a bottom electrode;

a top electrode provided over the second substrate to be spaced above and apart from the second substrate, the top electrode comprising a nanoplate having a nanometer-level thickness;

a supporter made of an insulating material, the supporter on a topmost surface of the first substrate and in direct contact with a bottommost surface of the top electrode, the supporter extending along an outermost periphery of the first substrate and the top electrode to define a continuous looped structure that supports and fixes an edge of the top electrode to an edge of the first substrate and to define a gap between the topmost surface of the first substrate, sidewalls of the supporter, and the bottommost surface of the top electrode, the gap comprising a vacuum sealed from an external environment by the substrate, the top electrode, and the supporter; and a plurality of nanoposts having a first end coupled and fixed directly to the topmost surface of the first substrate and a second end in direct contact with the bottommost surface of the top electrode though the plurality of through holes in the gap vacuum sealed from the external environment and being stretchable and compressible in a longitudinal direction to at least vertically move the top electrode when power is applied between the top electrode and the bottom electrode, wherein each of the plurality of nanoposts comprises a monocrystalline wire having a nanometer-level diameter of a semiconductor material; and a top plate reinforcement having a bottommost surface directly on a topmost surface of the top electrode opposite the plurality of nanoposts, the top plate reinforcement extending continuously over the plurality of nanoposts and positioned to prevent portions of the top electrode directly under the top plate reinforcement from bending while being vertically moved by the plurality of nanoposts, the bottommost surface above a topmost surface of the supporter when power is not applied to the top electrode and below the topmost surface of the supporter when power is applied to the top electrode, the top plate reinforcement comprising a plurality of holes vertically offset from and alternating with the plurality of nanoposts such that portions of the top electrode exposed by respective holes of the plurality of holes may vibrate separately from a spring motion of the plurality of nanoposts;

wherein, when power of a first frequency is applied between the top electrode and the bottom electrode, the plurality of nanoposts may be compressed and stretched and the top electrode coupled to the plurality of nanoposts may vertically move together with the top plate reinforcement; and wherein, when power of a second frequency is applied between the top electrode and the bottom electrode, the plurality of nanoposts do not compress or stretch and the portions of the top electrode exposed by respective holes of the plurality of holes operate at the second frequency independently of motion of the plurality of nanoposts.

\* \* \* \* \*